US012700664B2

(12) United States Patent
Han et al.

(10) Patent No.: US 12,700,664 B2
(45) **Date of Patent: *Aug. 4, 2026**

(54) ANTENNAS FOR ARTIFICIAL REALITY SYSTEMS

(71) Applicant: Meta Platforms Technologies, LLC, Menlo Park, CA (US)

(72) Inventors: Liang Han, Sunnyvale, CA (US); Lijun Zhang, Los Gatos, CA (US); Javier Rodriguez De Luis, Kirkland, WA (US); Chia-Ching Lin, San Jose, CA (US); Meijiao Li, San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/984,044

(22) Filed: Dec. 17, 2024

(65) Prior Publication Data

US 2025/0118888 A1 Apr. 10, 2025

Related U.S. Application Data

(63) Continuation of application No. 17/866,475, filed on Jul. 16, 2022, now Pat. No. 12,191,561.

(51) Int. Cl.

| | |
|---|---|
| ***H01Q 1/27*** | (2006.01) |
| ***H01Q 1/38*** | (2006.01) |
| ***H01Q 9/30*** | (2006.01) |

(52) U.S. Cl.

CPC ............... *H01Q 1/273* (2013.01); *H01Q 1/38* (2013.01); *H01Q 9/30* (2013.01)

(58) Field of Classification Search

CPC ...... H01Q 9/30; H01Q 1/1271; H01Q 1/1278; H01Q 1/1285; H01Q 1/273; H01Q 1/38; H01Q 1/40; H01Q 1/405

See application file for complete search history.

(56) References Cited

U.S. PATENT DOCUMENTS

| | | | | |
|---|---|---|---|---|
| 11,936,100 | B2 | 3/2024 | Jenkins et al. | |
| 12,191,561 | B1 * | 1/2025 | Han | H01Q 1/273 |
| 2023/0099937 | A1 | 3/2023 | Jadidian et al. | |
| 2024/0372261 | A1 * | 11/2024 | Yun | H01Q 1/273 |

* cited by examiner

*Primary Examiner* — Robert Karacsony

(74) *Attorney, Agent, or Firm* — Greenberg Traurig, LLP

(57) ABSTRACT

The disclosed system may include an antenna feed that has various electronic components. The system may also include a lens that has one or more layers, and an antenna embedded on at least a portion of the layers of the lens. The antenna may be electrically connected to at least one of the electronic components of the antenna feed. Various other apparatuses, wearable electronic devices, and methods of manufacturing are also disclosed.

18 Claims, 8 Drawing Sheets

ANTENNAS FOR ARTIFICIAL REALITY SYSTEMS

CROSS REFERENCE TO RELATED APPLICATIONS

This application is a Continuation of U.S. application Ser. No. 17/866,475 filed 16 Jul. 2022, the entire disclosure of which is incorporated herein by reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
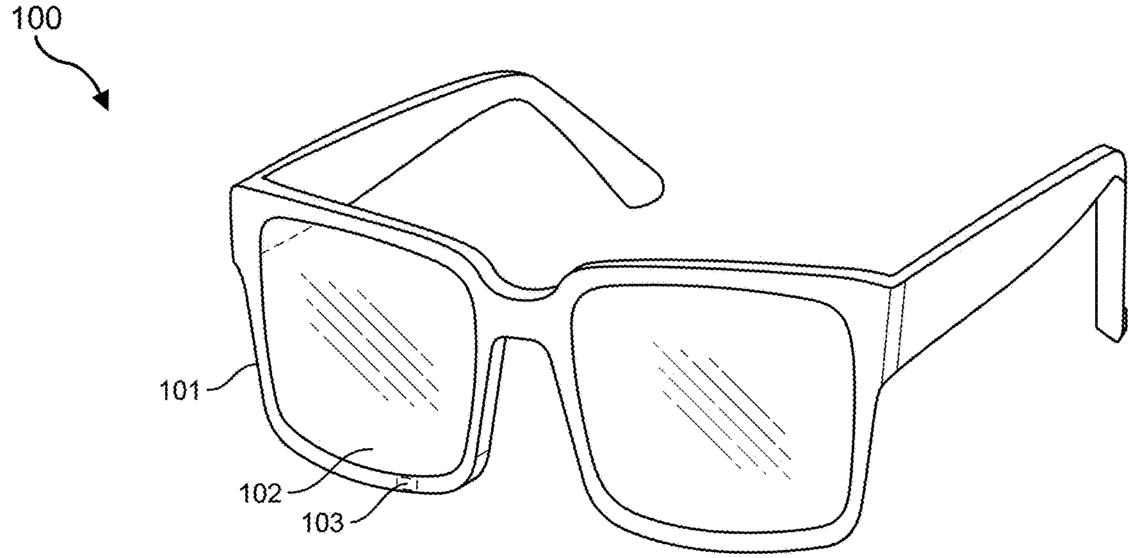
FIG. 1 is an illustration of an example pair of augmented reality glasses that may be used in conjunction with the embodiments herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for placing antennas on different layers of a lens in augmented reality (AR) glasses. In the past, some AR glasses have implemented antennas on the bottom rims of the glasses or have placed antennas in the temple arms or in other exterior positions to move them away from internal electronic components. While such placement may provide additional space between antennas and the other electrical and mechanical components of the AR glasses, these antenna placements may still constrain the overall size of the antennas. Such size constraints may limit the efficiency of the antennas and may limit which types of antennas can be used in the AR glasses.

The embodiments described herein, in contrast, may place antennas directly on the lenses of AR glasses (or, alternatively, on a watch face of a smart watch, or on another surface of a mobile wireless device). For example, the embodiments herein may place one or more antennas on an eye-tracking layer of a lens or on an active dimming layer of the lens. These lens layers (e.g., the eye-tracking layer and the active dimming layer) may accommodate different types of antennas (e.g., Wifi, Bluetooth, cellular (e.g., long term evolution (LTE), global positioning system (GPS), etc.) and may allow the use of longer or taller antennas. In some cases, multiple different types of antennas may be placed on the same lens layer. In one example, for instance, an LTE antenna may be placed on the eye-tracking layer along with a WiFi antenna.

In some embodiments, the eye-tracking layer of the AR glasses may include beneficial features that may aid in the operation of an antenna. For instance, the eye-tracking layer may be made of glass or plastic, which is not prone to signal absorption, may have a low dielectric constant, and may allow traces to be printed thereon. Placing the antennas on the active dimming (AD) layer may also have advantages in that the AD layer is already a conductive layer. Because the AD lens layer is fully (or at least partially) conductive, the antennas may be etched into the conductive AD layer, and may be etched in a way that maintains active dimming functionality with little to no detrimental visual impact. Because the antennas are positioned near the user's eyes, the embodiments herein may be designed to limit the total radiated power of the antennas. Moreover, the embodiments herein may maintain high directivity away from the user's face, may spatially distribute the antennas over the lens(es) to avoid interference, and may position the antennas in a manner that would provide cross-polarization between antennas to keep isolation high. Each of these embodiments will be explained in greater detail below with regard to FIGS. 1-8.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment of a wearable electronic device 100. The wearable electronic device 100 may be a pair of augmented reality glasses. In other embodiments, the wearable electronic device may be a smartwatch or may be a different kind of eyewear, or may be some other type of mobile electronic device that implements active dimming or implements a display portion that includes at least one layer of nonconductive material. In the example embodiment of FIG. 1, the augmented reality (AR) glasses may include a structural frame 101 and two lenses 102, one or more of which may include electronic components 103 placed nearby. These lenses may include an active dimming layer that includes a coating of a transparent conductive oxide (TCO) such as indium tin oxide (ITO) or some other type of TCO. These lenses 102 may also include an eye-tracking layer made of plastic, glass, or other nonconductive material.

The TCO material may be a poor conductor of electricity and may generally be referred to herein as a nonconductive material. It will be recognized that when using the terms "nonconductive" or "nonconductive materials" herein, these terms may refer to materials that are entirely nonconductive or may refer to materials that are slightly conductive but are very poor conductors. Thus, "nonconductive" does not necessarily imply zero conductivity, but could encompass materials that have negligible or very low levels of conductivity. As such, a nonconductive material may refer to any material that may impair antenna performance by absorbing the antenna's radiated power. Indeed, the embodiments herein may be designed to counteract or reduce the coupling that may occur between electronic components (e.g., 103) and active dimming layers, eye-tracking layers, or other lens layers.

Figure 2:
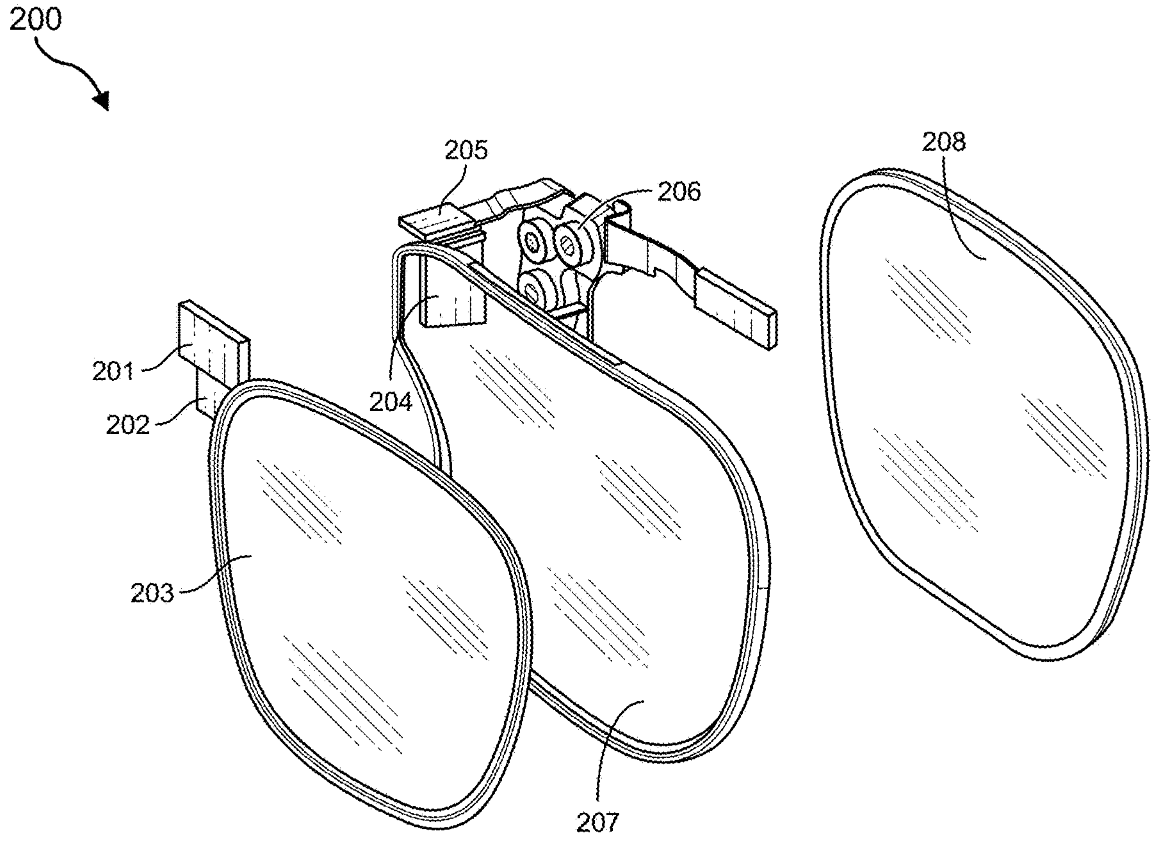
FIG. 2 is an illustration of multiple lens layers of a lens taken from a pair of augmented reality glasses.

FIG. 2 illustrates an exploded view of a lens 200. The lens 200 may include multiple different layers including an eye-tracking layer 203, a display layer 207, and/or an active dimming layer 208. The eye-tracking layer 203 may include various electronic components 201 including cameras, processors, controllers, volatile or nonvolatile memory, sensors, or other components. These electronic components 201 may be connected to one or more portions of the eye-tracking layer 203 via an electrical connection 202. In some cases, the electronic components 201 may include an antenna feed that itself includes one or more radios, amplifiers, signal processors, impedance matching circuits, or other components. The antenna feed may be connected to one or more antennas that are disposed on the eye-tracking layer 203. As will be described further below, these antennas may be formed using transparent conductive materials including indium tin oxide (ITO) or other TCOs, conductive polymers, graphene, carbon nanotubes, nanowire meshes, ultrathin metal films, or other transparent conductive materials. Because the antennas are made from transparent material(s), they may not cause visual disruptions to a user, even if the antennas are disposed directly on the eye-tracking or active dimming layers.

The display layer 207 of the lens 200 may further include electronic components such as a display projector 206 and a waveguide 204 or other means of projecting light onto the display layer 207. The display layer 207 may similarly have electronic components 205 that may be used to generate and/or provide images to a user's eyes. While not generally described as including antennas in the embodiments herein, it will be understood that, at least in some embodiments, one or more antennas may be disposed on at least a portion of the display layer 207.

Still further, one or more antennas may be disposed on the active dimming layer 208. The active dimming layer may be constructed using ITO or other materials that allow for applied voltages to change the amount of light that travels through the active dimming layer 208. Because the active dimming layer 208 may be manufactured using conductive materials, the embodiments herein may be configured to etch antennas directly into the conductive material. This process is described further below with regard to the various antenna embodiments of FIGS. 3A-5D.

Figure 3A:
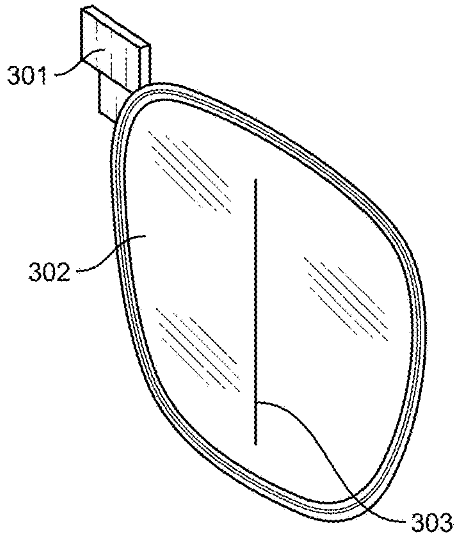
FIG. 3A is an illustration of a lens layer that includes an antenna embedded thereon.

FIG. 3A illustrates an embodiment of an eye-tracking layer 302 of a lens that may be used in AR glasses, in a smartwatch, or in another electronic device. The eye-tracking layer 302 may include a monopole antenna 303. The monopole antenna 303 may be connected to an antenna feed and/or other electronic components 301. In some cases, the monopole antenna 303 may be made of indium tin oxide or another type of transparent conductive oxide. The monopole antenna 303 may be placed in the center of the lens, as shown, or may be placed on the right or left side of the lens. Alternatively, the monopole antenna 303 may be placed horizontally with respect to the lens in the upright (as-worn) position. In such cases, the horizontally placed monopole antenna 303 may be positioned in the middle of the eye-tracking layer 302, in the top portion, in the bottom portion, or substantially anywhere on the lens that is long enough to accommodate the length of the monopole antenna 303. Here, it will be recognized that, while many of the embodiments described herein include monopole or dipole antennas, the embodiments herein may include substantially any type of antennas including, without limitation, slot antennas, loop antennas, inverted-F antennas (IFAs), planar inverted-F antennas (PIFAs), patch antennas, or other types of antennas. Moreover, at least in some cases, an entire lens (or both lenses) may be excited as an antenna. These embodiments are further described below with regard to FIGS. 5A-5F.

Figure 3B:
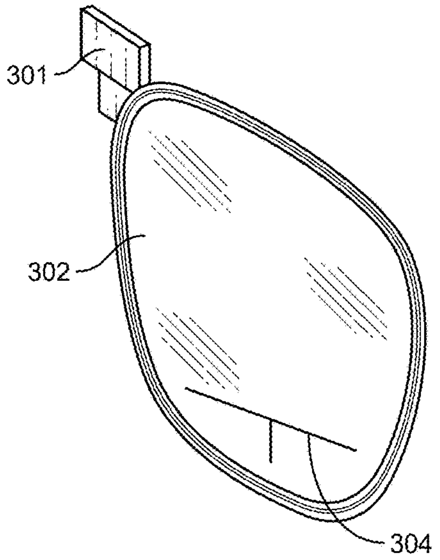
FIG. 3B is an illustration of a lens layer that includes an alternative antenna embedded thereon.

FIG. 3B illustrates an embodiment in which a dipole antenna 304 may be positioned on or disposed on the eye-tracking layer 302 of an AR glass lens. Like the monopole antenna 303, the dipole antenna 304 may be made of a transparent conductive oxide, a conductive polymer, carbon nanotubes, or other conductive, transparent material. The dipole antenna 304 may be placed on the top, bottom, sides, middle other position on the eye-tracking layer 302. In some cases, both a monopole antenna 303 and a dipole antenna 304 may be disposed on the same eye-tracking layer 302 of the lens. In some embodiments, three or more antennas may be disposed on the same eye-tracking layer 302. In such cases, each antenna may be connected to a separate antenna feed and/or other electronic components 301. Each antenna may be positioned far enough from the other antennas to avoid coupling or interference. It should also be understood that other types of antennas, including loop antennas or slot antennas, may be disposed on the eye-tracking layer, either singly or in combination with the antennas described above.

In some embodiments, the eye-tracking layer 302 may be made of glass, plastic, or other nonconductive material. In such cases, the antenna (e.g., 303 or 304) may be applied as a coating or as a mesh that is adhered to the nonconductive material. In some cases, the antennas applied to the eye-tracking layer may be configured to operate with a minimum level of directivity. That is, at least in some cases, the directivity of the antennas may be at least a specified minimum value. This minimum level of directivity may ensure that the majority of the radiated power from the antennas is directed away from the user when wearing the device. By implementing a minimum directivity value, the embodiments herein may ensure that the amount of radiated power directed away from the user's head or body is above a minimum value, and the among of radiated power directed at the user's head or body is below a maximum threshold value. Other operating characteristics of the antennas may also be designed for and controlled, as will be explained further below.

In some cases, a system or apparatus such as a pair of AR glasses may include an antenna feed that, itself, has different electronic components. The AR glasses may also include a lens that has multiple layers (e.g., 203, 207, and 208 of FIG. 2). Still further, the AR glasses may include an antenna embedded on at least some part of at least one of the layers of the lens. The antenna may be wholly disposed on the lens layer (e.g., 302 of FIG. 3), or may be partially disposed on the lens layer and partially on the frame of the AR glasses. In some cases, multiple antennas may be disposed on the same lens layer, while in other cases, a lens layer may have no antennas or only one antenna. Each antenna may be electrically connected to at least one of the electronic components of the antenna feed, thereby supplying the antenna with the radiating power needed to wirelessly communicate with other devices or networks.

As noted above, the eye-tracking layer 302 may be formed at least partially using a nonconductive material such as glass or plastic. In some cases, the antenna may be printed onto the nonconductive material of the eye-tracking layer 302. Alternatively, the antenna (e.g., 303 or 304) may be etched into the nonconductive material of the eye-tracking layer 302. This etching process may provide an etched groove or trough into which a transparent conductive antenna may be placed. The etching or printing processes may be small enough in nature to not be visible to the human eye. As such, users of AR glasses having such lenses may not be aware that at least some of the lens layers have antennas embedded therein or placed thereon.

Figure 4A:
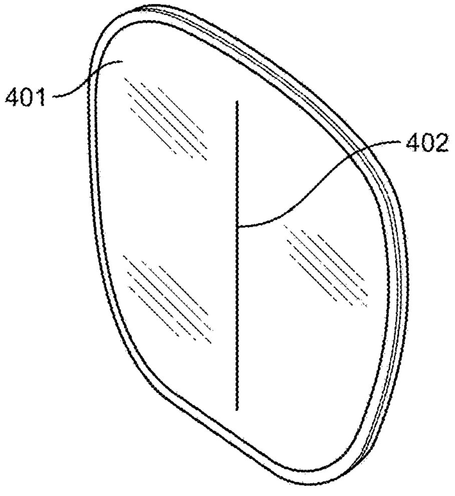
FIG. 4A is an illustration of a lens layer that includes an antenna embedded thereon.
Figure 4B:
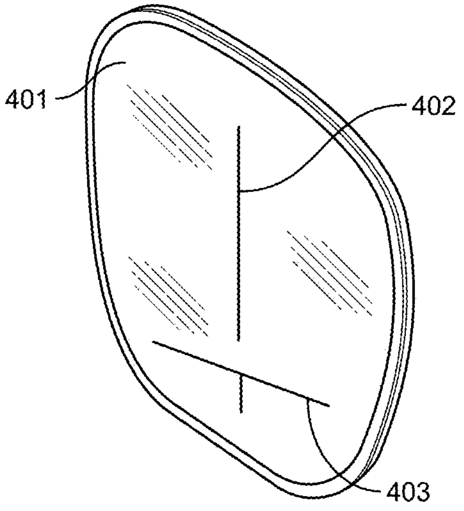
FIG. 4B is an illustration of a lens layer that includes an alternative antenna embedded thereon.

FIGS. 4A and 4B illustrate embodiments in which antennas may be disposed on an active dimming layer 401 of an AR glass lens. A monopole antenna 402, for example, may be disposed on active dimming layer 401. The active dimming layer 401 may be formed (at least partially) using a conductive material such as indium tin oxide. In such cases where the lens layer includes conductive material, some of that material may be etched away to provide separation between an antenna (e.g., 402 or 403) and the conductive material. This separation may be sufficient to prevent coupling between the conductive active dimming layer and the antenna. After the conductive active dimming layer has been etched, the antenna may be disposed (e.g., printed or coated) onto the etched portion of the active dimming layer 401. In some cases, a single antenna may be provided on the active dimming layer 401 (e.g., monopole antenna 402 of FIG. 4A) and, in other cases, multiple antennas may be provided on the active dimming layer 401 (e.g., monopole antenna 402 and dipole antenna 403). The antennas 402/403 may be placed in different positions on the active dimming layer 401 and may be placed horizontally (as shown), vertically, diagonally, or in another manner. The antennas may be spaced sufficiently far apart that each antenna may operate at a minimum total radiated power.

Indeed, the antennas (e.g., 303, 304, 402, 403, etc.) may each be operated according to one or more specified operating characteristics. Each antenna may be operated independently from the other antennas, or, in other cases, some of the antennas may be operated together as a group. In some examples, one of the operating characteristics of at least one of the antennas may be a maximum level of total radiated power. This total radiated power may represent an amount of power in watts that is radiated by a specific antenna. In some cases, antennas may fail to operate properly when operating below a minimum level of total radiated power. Similarly, mobile devices that are close to a user's body may be constrained in the total amount of power they are permitted to radiate. As such, the systems herein may ensure that each of the antennas is operating at the minimum (or higher) total radiated power and below the maximum radiated power. If multiple antennas are operating at the same time, the systems herein may ensure that the group of antennas is, together, operating below a maximum total radiated power for the group of antennas.

Another operating characteristic of the antennas may be a minimum level of directivity. As noted above, the radiated power of an antenna may be concentrated in a certain direction. This "directivity" ensures that more of the radiated waves are propagated away from the user than are directed toward the user. The antennas (e.g., 303, 402) may be structurally designed to have a high level of directivity (as opposed to more general, omnidirectional radiation), and then channel that directivity away from the user. In some cases, the amount of directivity (in dB) may be above a specified value for each antenna.

In some embodiments, a wearable electronic device may be otherwise provided. In some cases, the wearable electronic device may be a pair of augmented reality glasses (e.g., 100 of FIG. 1). In most embodiments, the AR glasses may include two lenses, but, in some cases, more or fewer lenses may be provided. In the embodiment 500A of FIG. 5A, each AR glass lens may include three layers (although, more or fewer layers may be used). In the embodiment 500A of FIG. 5A, the left-side lens may include an eye-tracking layer 501, a display layer 503 (with accompanying components such as light sources 505 and waveguides), and an active dimming layer 506. Similarly, the right-side lens may include an eye-tracking layer 502, a display layer 504, and an active dimming layer 507. Each of these lens layers may be capable of including a transparent antenna. The antenna may be electrically connected to an antenna feed that receives, transmits, and processes incoming or outgoing wireless signals.

Figure 5A:
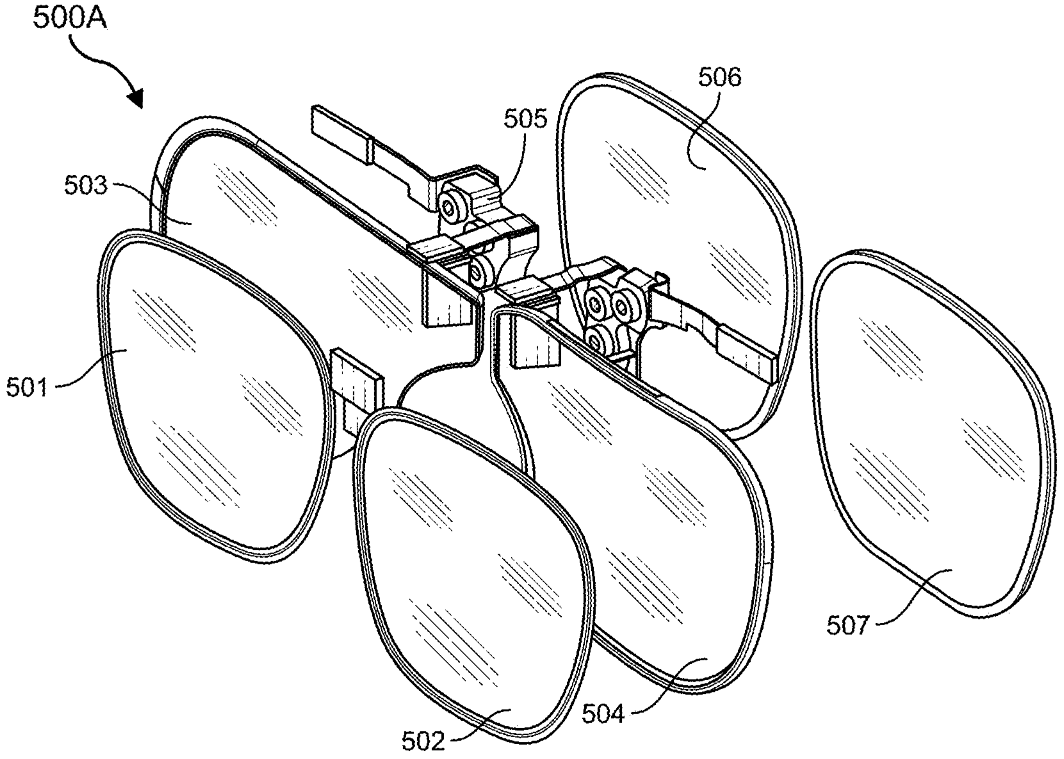
FIGS. 5A-5F are illustrations of different lens layers that include different types of embedded antennas.
Figure 5B:
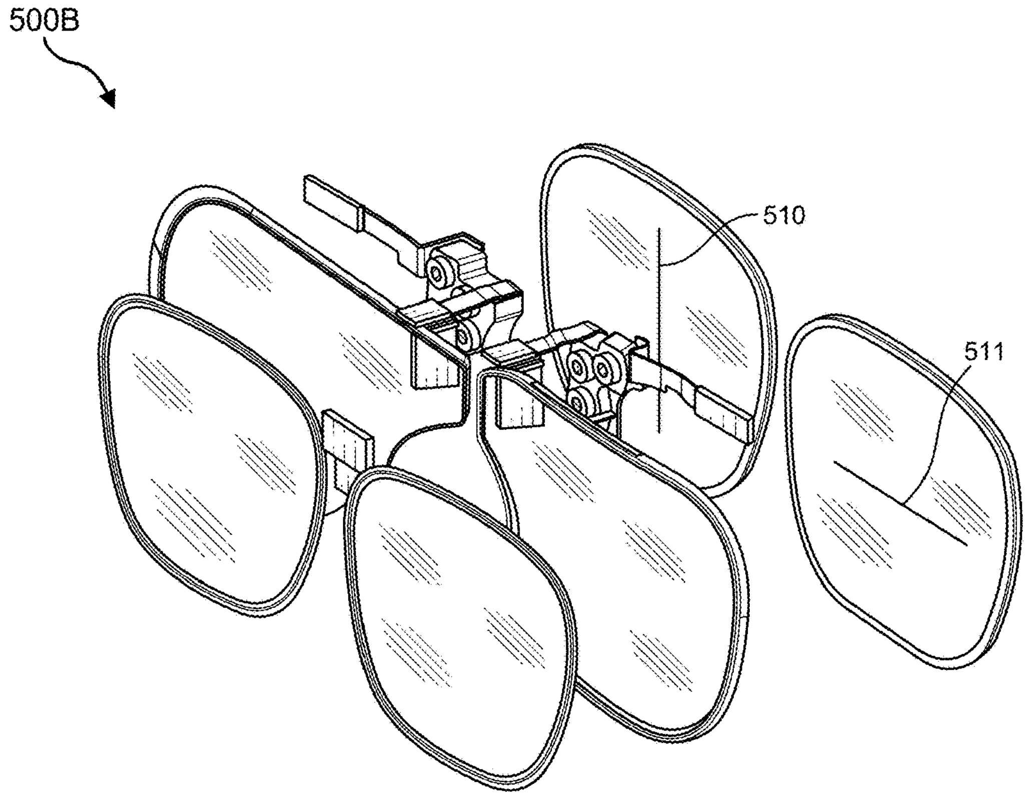
Figure 5C:
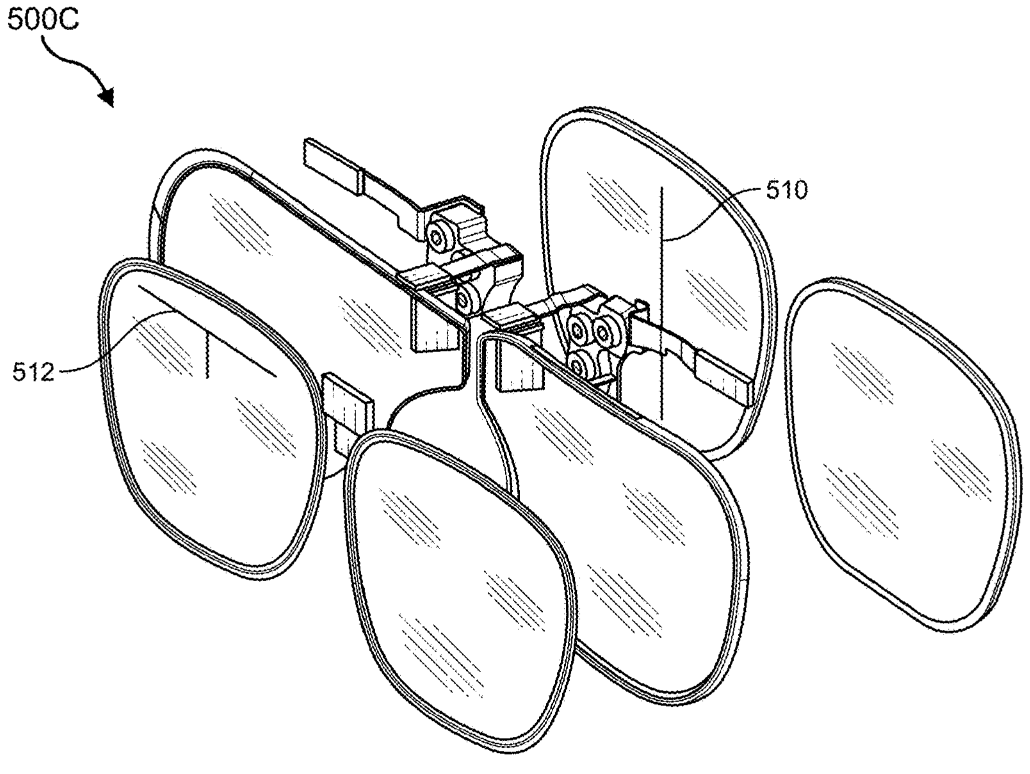

In embodiment 500B of FIG. 5B, the active dimming layers 506/507 of each of the right- and left-side lenses may include an antenna disposed thereon. In this example, each of the antennas 510 and 511 is a monopole antenna. However, in the left-side active dimming layer, the antenna 510 is vertically oriented, and in the right-side active dimming layer, the monopole antenna 511 is horizontally oriented. Other orientations, including diagonal orientations, are also possible. In some cases, a right-side lens may include a horizontal monopole antenna, while the left-side lens includes a vertical monopole (or other type of) antenna. In other cases, as shown in embodiment 500C of FIG. 5C, there may be no antennas on the right-side lens, while both the left-side active dimming layer 506 and the left-side eye-tracking layer 501 include antennas 510/512, respectively. In this example, the active dimming layer 506 may include a vertically aligned monopole antenna 510, and the eye-tracking layer 501 may include a horizontally aligned dipole antenna 512. Thus, different layers of the same lens may include different antennas and may include different types of antennas.

In some cases, antennas may be placed in certain positions or on certain lens layers to maximize available lens space. In general, antennas that operate at lower frequencies (e.g., cellular 100 MHz) are larger, and antennas that operate at higher frequencies (e.g., WiFi 2.4 GHz) may be smaller in size. Thus, in some embodiments, the larger antennas for low frequency operation may be placed first, and smaller antennas for higher frequency operation may be placed second. Each antenna may be connected to its own antenna feed and each antenna/antenna feed combination may be designed to avoid coupling or interference with other nearby antennas. As such, antennas that operate at the same or similar frequencies may be placed on separate lenses or separate lens layers to provide separation between the potentially interfering antennas.

Figure 5D:
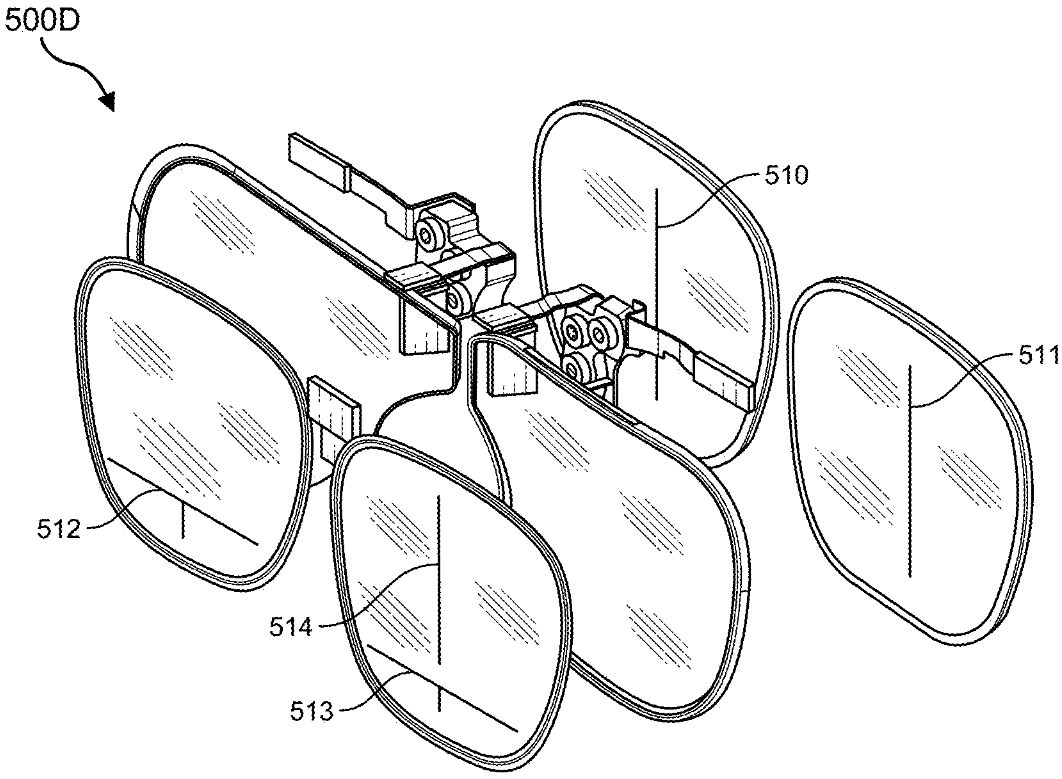
Figure 5E:
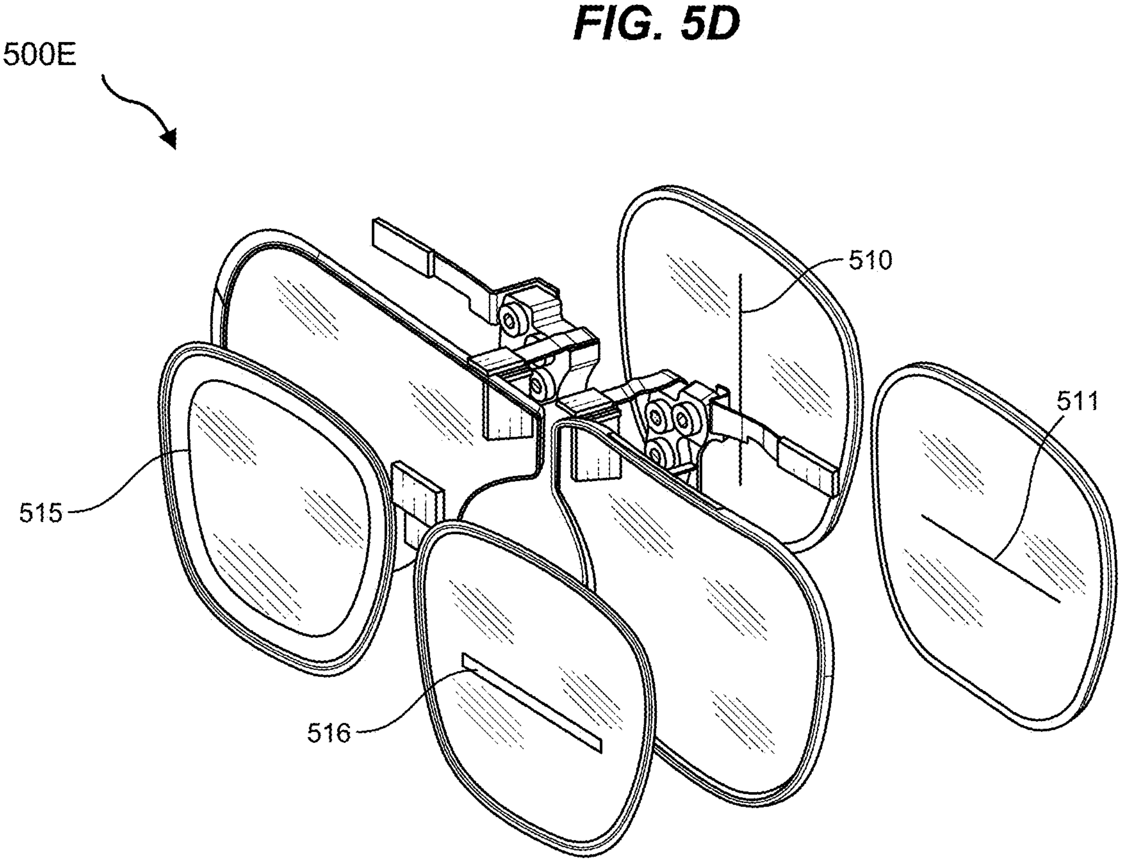

In some cases, as shown in embodiment 500D of FIG. 5D, some of the lens layers may include multiple antennas disposed thereon. For instance, while the left-side eye-tracking layer and active dimming layers may include dipole and monopole antennas 512/510, respectively, and while the right-side active dimming layer 507 may include a vertical monopole antenna 511, the right-side eye-tracking layer 502 may include both a dipole antenna 513 and a vertical monopole antenna 514. In some examples, a single lens layer may include three or more antennas. Each antenna may be selected not to interfere with the other antennas of that lens layer or of an opposing lens layer.

As noted above, the embodiments described herein may include many different types of antennas, including slot antennas, loop antennas, IFAs, PIFAs, patch antennas, or other types of antennas. Indeed, as shown in embodiment 500E of FIG. 5E, the left-side eye-tracking layer may include a loop antenna 515, while the right-side eye-tracking layer may include a slot antenna 516. These antennas may be implemented individually, or in combination with monopole antennas 510 and/or 511 of the right- and left-side active dimming layers.

Figure 5F:
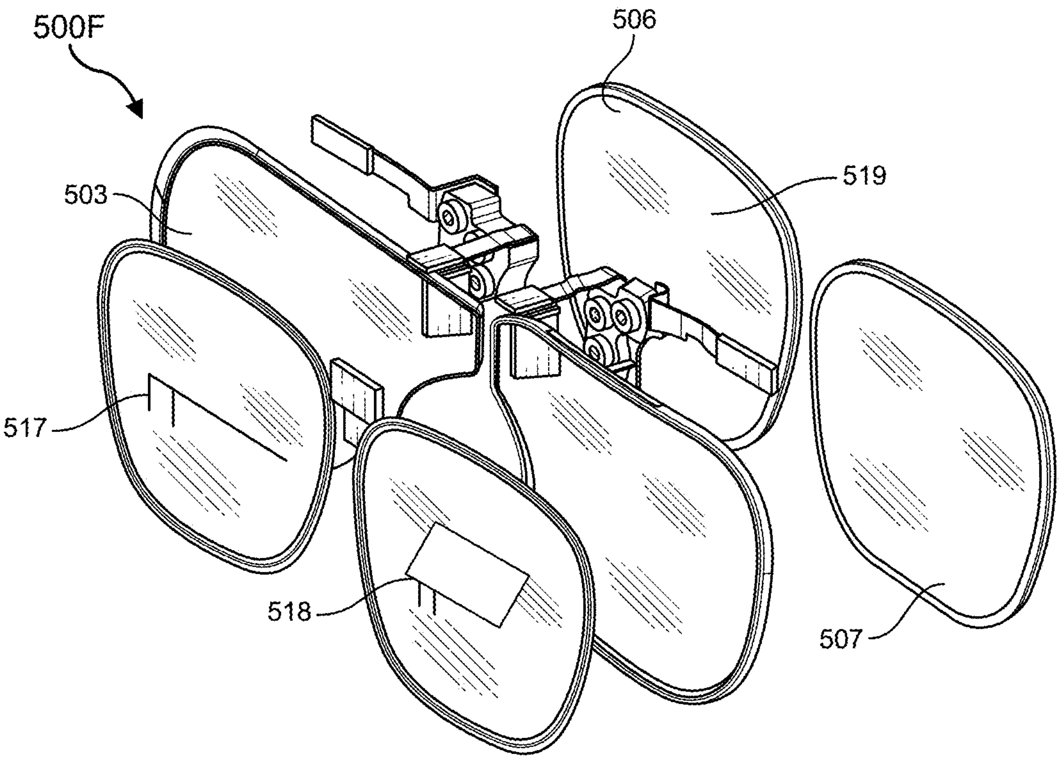

Still further, as shown in embodiment 500F of FIG. 5F, the embodiments described herein may include inverted-F antennas and/or planar inverted-F antennas. For instance, an IFA 517 may be positioned on the left-side eye-tracking layer in embodiment 500F. Additionally or alternatively, a PIFA 518 may be positioned on the right-side eye-tracking layer of the AR glasses. These antennas may be in addition to any other antennas placed on different parts of the eye-tracking layer, or on different layers including the active dimming layer. In some cases, a thin-film transparent antenna layer 519 may be positioned on the left-side active dimming layer 506 and/or on the right-side active dimming layer 507. This thin-film transparent antenna layer 519 may include indium tin oxide or other transparent conductive oxides. The thin-film transparent antenna layer 519 may cover some or all of the lens' active dimming layer. The thin-film transparent antenna layer 519 may be excited by an antenna feed and may be implemented to transmit and receive wireless signals. This thin-film transparent antenna layer 519 may be implemented alone or in addition to any of the antennas mentioned above, whether on the same lens layer or on different lens layers, or whether on the same lens or on different lenses.

In some cases, multiple antennas of the same type may be disposed on the same lens layer. Thus, for instance, the right-side eye-tracking layer 502 may include two monopole antennas or two dipole antennas or two loop antennas. Other combinations may also be used. In each case, the antennas may be spaced or distributed over a specified area of that lens layer. In some cases, a minimum specified area may be designated for each antenna type or for antennas designed to operate at different frequencies. Thus, antennas designed to operate at lower frequencies may be designated a larger minimum area, while antennas designed to operate at higher frequencies may be designated a smaller minimum area on the lens layer.

In embodiments where multiple antennas are placed on a single lens layer (e.g., active dimming or eye-tracking), one antenna (e.g., dipole antenna 513) may be configured to operate at a first specified frequency, and a second antenna (e.g., monopole antenna 514) may be configured to operate at a second, different specified frequency. In such cases, the antennas operating at different frequencies may be less likely to interfere with each other. In some embodiments, antennas that are determined to interfere with each other (or to potentially interfere with each other) may be embedded on different lenses or different lens layers.

In cases where the antennas are provided on the eye-tracking layer, the antennas may be printed onto the interior (e.g., user-facing) or exterior (e.g., world-facing) surface of the eye-tracking layer. Alternatively, the antennas may be etched into the interior or exterior surface of the eye-tracking layer. In cases where the antennas are provided on the active dimming layer, the interior or exterior surfaces of the active dimming layer may be etched to include space for an antenna. In such cases, the etchings may be small enough to be invisible to human eyes. Moreover, the etchings may be thin and/or shallow enough to allow placement of the antenna(s) while not preventing the active dimming layer from performing its dimming functions. In this manner, the active dimming layer and/or the eye-tracking layer of AR glasses may host multiple different types of antennas designed to operate at multiple different frequencies.

Figure 6:
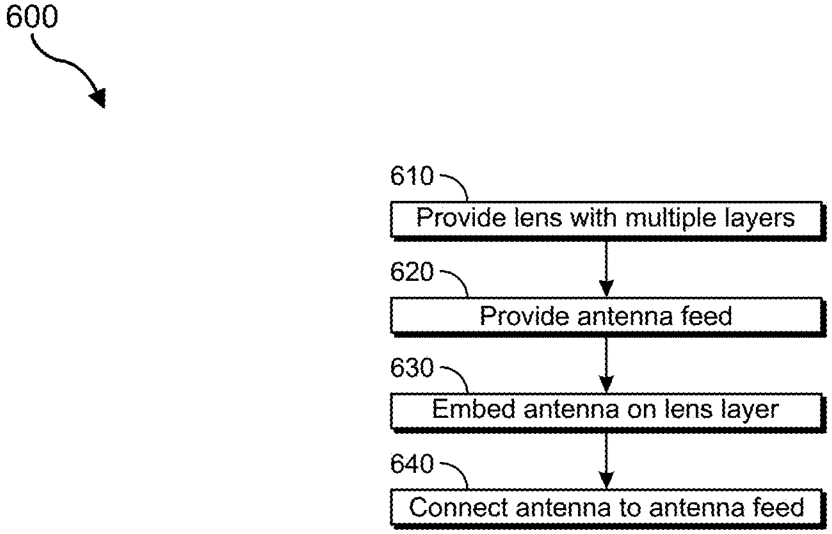
FIG. 6 is a flow diagram of an exemplary method for manufacturing lens layers that have antennas embedded thereon.

FIG. 6 is a flow diagram of method of manufacturing 600 for generating or producing a wearable electronic device (e.g., AR glasses) that includes at least one lens that has antennas disposed thereon. The steps shown in FIG. 6 may be performed by any suitable manufacturing equipment, and may be controlled using any suitable computer-executable code and/or computing system.

Method of manufacturing 600 may include providing, at step 610, a lens that includes one or more layers (e.g., eye-tracking, display, or active dimming layers). The method may next include, at step 620, assembling an antenna feed to be proximate to the lens layers. The antenna feed may include electronic components that assist in the reception or transmission of wireless signals on different bands. The method of manufacturing 600 may further include, at step 630, embedding the antenna(s) on at least some part of at least one of the layers of the lens and, at step 640, electrically connecting the antenna to the electronic components of the antenna feed.

Using this method of manufacturing, the embodiments herein may provide AR glasses or other electronic devices that include different types of antennas embedded into the lenses of the electronic devices. The antennas may be specifically placed so as to avoid interference with each other, and may be printed or etched depending on the conductivity of the lens layer to which they are being applied. This may allow the AR glasses (or other wearable electronic devices) produced by this method to take advantage of the relatively large space that may be available for antennas on the surfaces of the various layers of the lenses, when appropriately designed and applied.

Example Embodiments

Example 1: A system may include an antenna feed including one or more electronic components, a lens that comprises one or more layers, and an antenna embedded on at least a portion of at least one of the layers of the lens, wherein the antenna is electrically connected to at least one of the electronic components of the antenna feed.

Example 2: The system of Example 1, wherein at least one of the layers of the lens comprises an eye-tracking layer.

Example 3: The system of Example 1 or Example 2, wherein the eye-tracking layer is formed at least partially using a nonconductive material, and wherein the antenna is at least partially etched into the nonconductive material of the eye-tracking layer.

Example 4: The system of any of Examples 1-3, wherein the eye-tracking layer is formed at least partially using a nonconductive material, and wherein the antenna is at least partially printed onto the nonconductive material of the eye-tracking layer.

Example 5: The system of any of Examples 1-4, wherein the antenna is formed using a transparent conductive material.

Example 6: The system of any of Examples 1-5, wherein at least one of the layers of the lens comprises an active dimming layer.

Example 7: The system of any of Examples 1-6, wherein the active dimming layer is formed at least partially using a conductive material, and wherein the antenna is at least partially etched into the conductive material of the active dimming layer.

Example 8: The system of any of Examples 1-7, wherein the antenna is operated according to one or more specified operating characteristics.

Example 9: The system of any of Examples 1-8, wherein at least one of the specified operating characteristics of the antenna comprises a maximum level of total radiated power.

Example 10: The system of any of Examples 1-9, wherein at least one of the specified operating characteristics of the antenna comprises a minimum level of directivity.

Example 11: A wearable electronic device may include an antenna feed including one or more electronic components, a lens that comprises one or more layers, and an antenna embedded on at least a portion of at least one of the layers of the lens, wherein the antenna is electrically connected to at least one of the electronic components of the antenna feed.

Example 12: The wearable electronic device of Example 11, wherein the lens includes at least two layers including an eye-tracking layer and an active dimming layer.

Example 13: The wearable electronic device of Example 11 or Example 12, wherein the eye-tracking layer includes the antenna embedded thereon, and wherein the active dimming layer includes a second, different antenna embedded thereon.

Example 14: The wearable electronic device of any of Examples 11-13, wherein at least one of the layers of the lens includes a plurality of antennas disposed thereon.

Example 15: The wearable electronic device of any of Examples 11-14, wherein the plurality of antennas is distributed over a minimum specified area of the lens layer.

Example 16: The wearable electronic device of any of Examples 11-15, wherein the plurality of antennas includes a first antenna configured to operate at a first specified frequency, and includes a second antenna configured to operate at a second, different specified frequency.

Example 17: The wearable electronic device of any of Examples 11-16, further includes a second antenna feed including one or more electronic components, a second lens that includes one or more layers, and a second antenna embedded on at least a portion of at least one of the layers of the second lens, wherein the second antenna is electrically connected to at least one of the electronic components of the second antenna feed.

Example 18: The wearable electronic device of any of Examples 11-17, wherein antennas determined to interfere with each other are embedded on different lenses.

Example 19: The wearable electronic device of any of Examples 11-18, wherein the antenna comprises at least one of a monopole antenna, a dipole antenna, a slot antenna, a loop antenna, an inverted-F antenna (IFA), or a planar inverted-F antenna (PIFA).

Example 20: A method of manufacturing may include providing a lens that comprises one or more layers, assembling an antenna feed to the lens, wherein the antenna feed includes one or more electronic components, embedding an antenna on at least a portion of at least one of the layers of the lens, and electrically connecting the antenna to at least one of the electronic components of the antenna feed.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
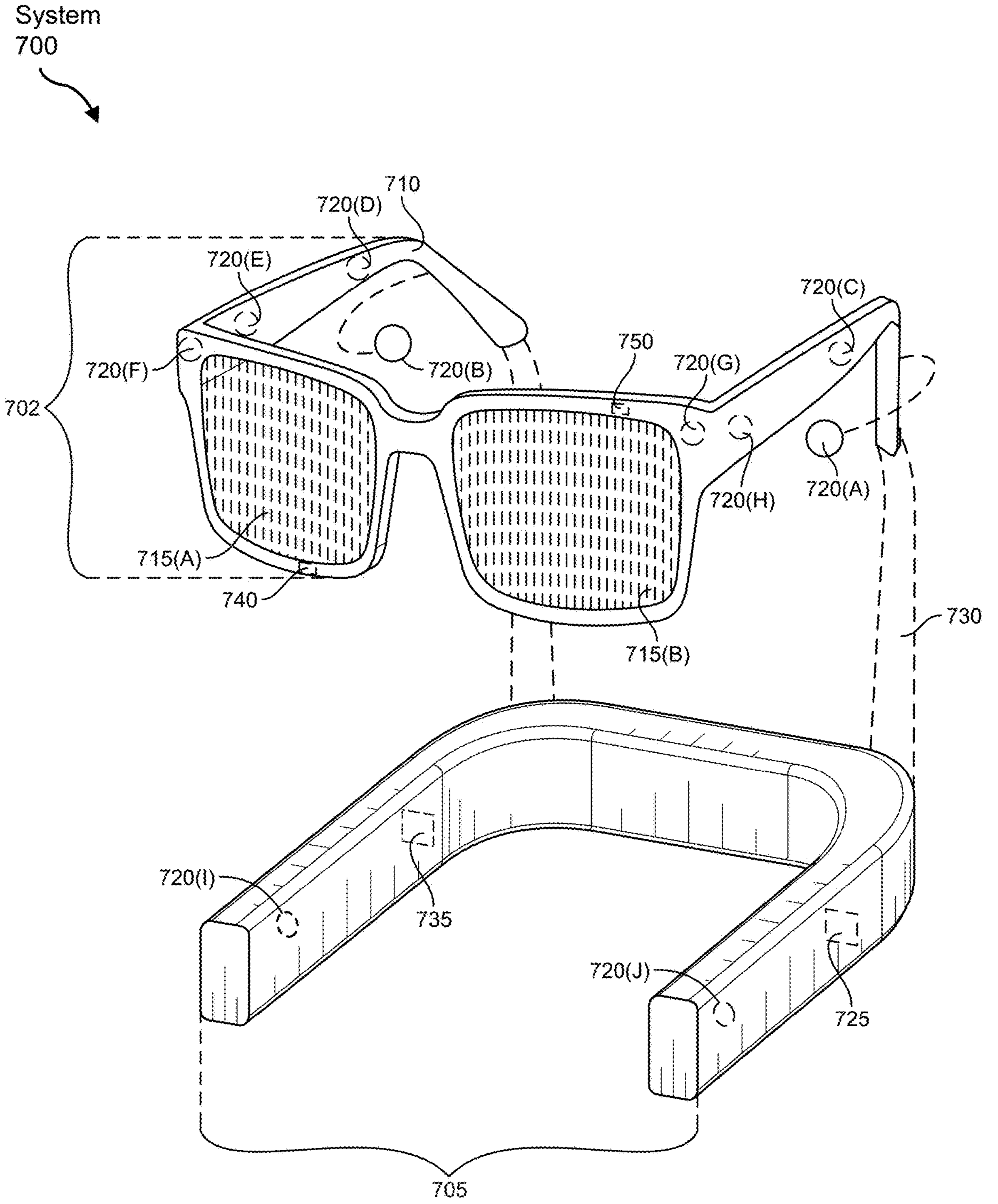
FIG. 7 is an illustration of exemplary augmented-reality glasses that may be used in connection with embodiments of this disclosure.
Figure 8:
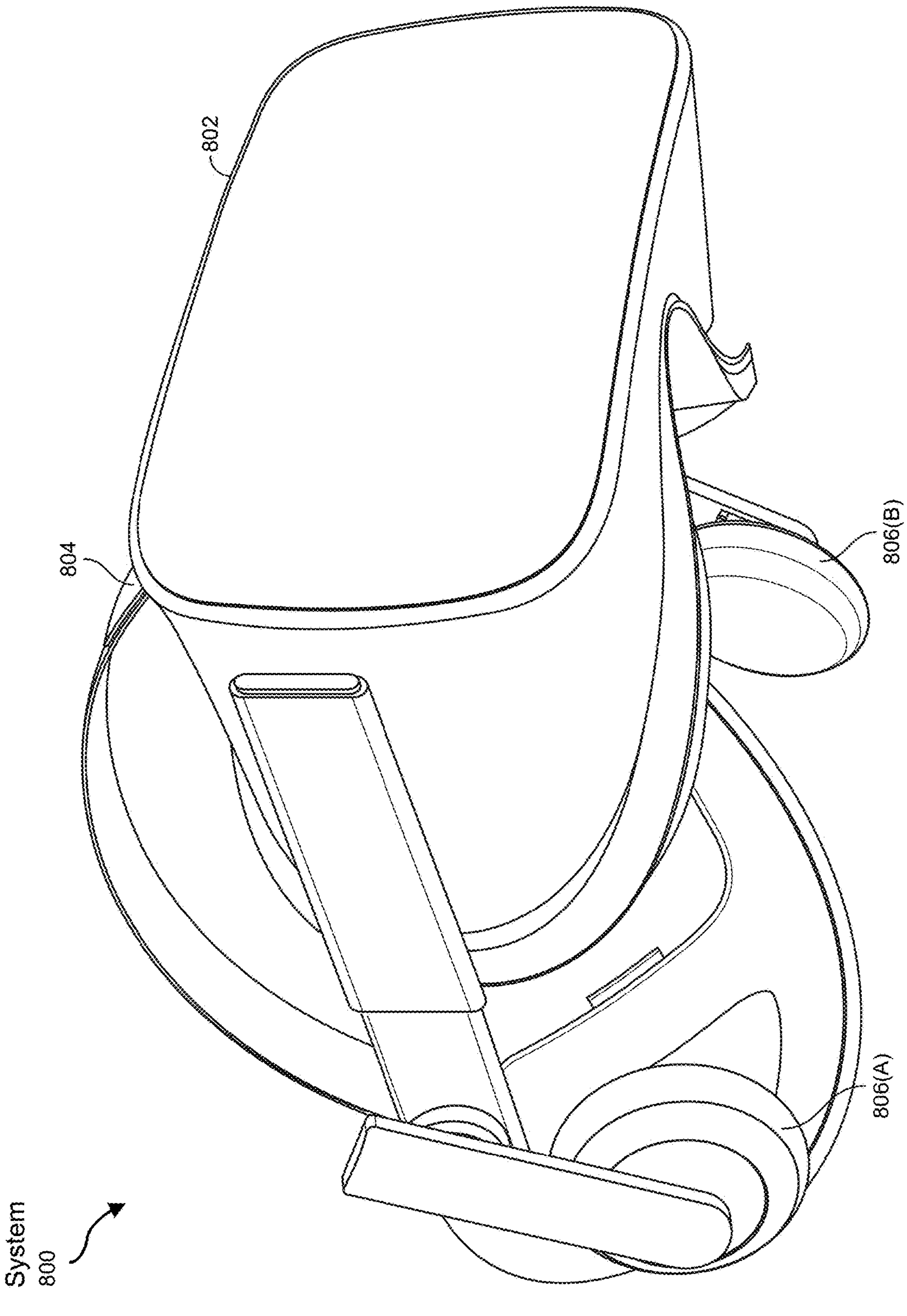
FIG. 8 is an illustration of an exemplary virtual-reality headset that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720 (G), and 720(H), which may be positioned at various locations on frame 710, and/or acoustic transducers 720(*I*) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720(D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCOS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a first antenna feed and a second antenna feed that each include one or more electronic components;

a lens that comprises one or more layers;

a first antenna embedded on at least a portion of a selected layer of the layers of the lens, wherein the first antenna is electrically connected to at least one of the electronic components of the first antenna feed; and a second antenna embedded on at least a portion of the same, selected layer of the lens, wherein the second antenna is electrically connected to at least one of the electronic components of the second antenna feed, wherein at least one of the one or more layers of the lens comprises at least one of an active dimming layer or an eye-tracking layer.

2. The system of claim 1, wherein at least one of the first antenna or the second antenna are formed using a transparent conductive material.

3. The system of claim 1, wherein the active dimming layer is formed at least partially using a conductive material, and wherein at least one of the first antenna or the second antenna is at least partially etched into the conductive material of the active dimming layer.

4. The system of claim 1, wherein the eye-tracking layer is formed at least partially using a nonconductive material, and wherein at least one of the first antenna or the second antenna is at least partially etched into the nonconductive material of the eye-tracking layer.

5. The system of claim 1, wherein the eye-tracking layer is formed at least partially using a nonconductive material, and wherein at least one of the first antenna or the second antenna is at least partially printed onto the nonconductive material of the eye-tracking layer.

6. The system of claim 1, wherein at least one of the first antenna or the second antenna is operated according to one or more specified operating characteristics.

7. The system of claim 6, wherein at least one of the specified operating characteristics of at least one of the first antenna or the second antenna comprises a maximum level of total radiated power.

8. The system of claim 6, wherein at least one of the specified operating characteristics of at least one of the first antenna or the second antenna comprises a minimum level of directivity.

9. A wearable electronic device comprising:

a first antenna feed and a second antenna feed that each include one or more electronic components;

a lens that comprises one or more layers;

a first antenna embedded on at least a portion of a selected layer of the layers of the lens, wherein the first antenna is electrically connected to at least one of the electronic components of the first antenna feed; and a second antenna embedded on at least a portion of the same, selected layer of the lens, wherein the second antenna is electrically connected to at least one of the electronic components of the second antenna feed, wherein at least one of the one or more layers of the lens comprises at least one of an active dimming layer or an eye-tracking layer.

10. The wearable electronic device of claim 9, wherein the first antenna comprises at least one of a monopole antenna, a dipole antenna, a slot antenna, a loop antenna, an inverted-F antenna (IFA), or a planar inverted-F antenna (PIFA), and wherein the second antenna comprises at least one of a monopole antenna, a dipole antenna, a slot antenna, a loop antenna, an inverted-F antenna (IFA), or a planar inverted-F antenna (PIFA).

11. The wearable electronic device of claim 9, further comprises a second lens and a third antenna, wherein antennas determined to interfere with each other are embedded on different lenses.

12. The wearable electronic device of claim 9, wherein the lens includes the eye-tracking layer and the active dimming layer.

13. The wearable electronic device of claim 12, wherein the eye-tracking layer includes the first antenna embedded thereon, and wherein the active dimming layer includes the second antenna embedded thereon.

14. The wearable electronic device of claim 9, wherein a third antenna is disposed on a different layer of the lens.

15. The wearable electronic device of claim 9, wherein the first and second antennas are distributed over a minimum specified area of the at least one layer of the lens.

16. The wearable electronic device of claim 12, wherein the first antenna is configured to operate at a first specified frequency, and wherein the second antenna is configured to operate at a second, different specified frequency.

17. The wearable electronic device of claim 9, wherein at least one of the first antenna or the second antenna is operated according to one or more specified operating characteristics.

18. A method of manufacturing comprising:

providing a first antenna feed and a second antenna feed that each include one or more electronic components;

providing a lens that comprises one or more layers;

embedding a first antenna on at least a portion of a selected layer of the layers of the lens, wherein the first antenna is electrically connected to at least one of the electronic components of the first antenna feed; and embedding a second antenna on at least a portion of the same, selected layer of the lens, wherein the second antenna is electrically connected to at least one of the electronic components of the second antenna feed, wherein at least one of the one or more layers of the lens comprises at least one of an active dimming layer or an eye-tracking layer.

* * * * *